V. G. APPLE.
POWER TRANSMISSION GEARING.
APPLICATION FILED NOV. 9, 1912.
1,129,777.
Patented Feb. 23, 1915.
5 SHEETS—SHEET 3.
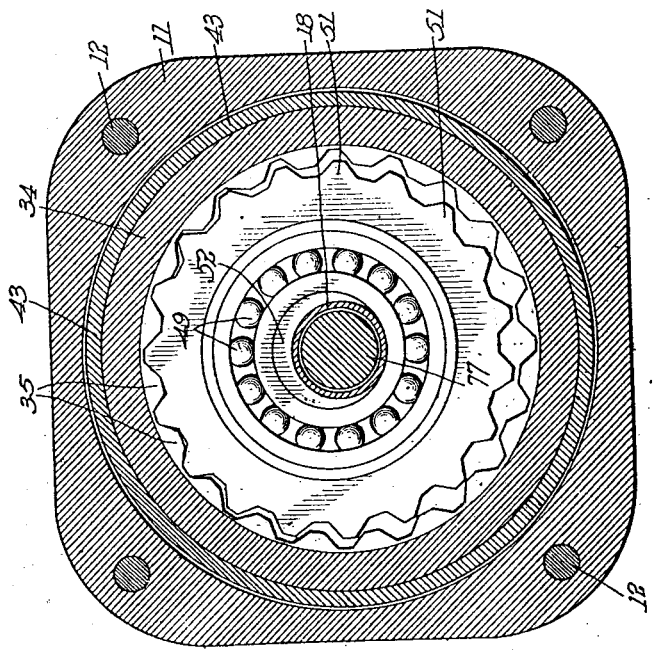
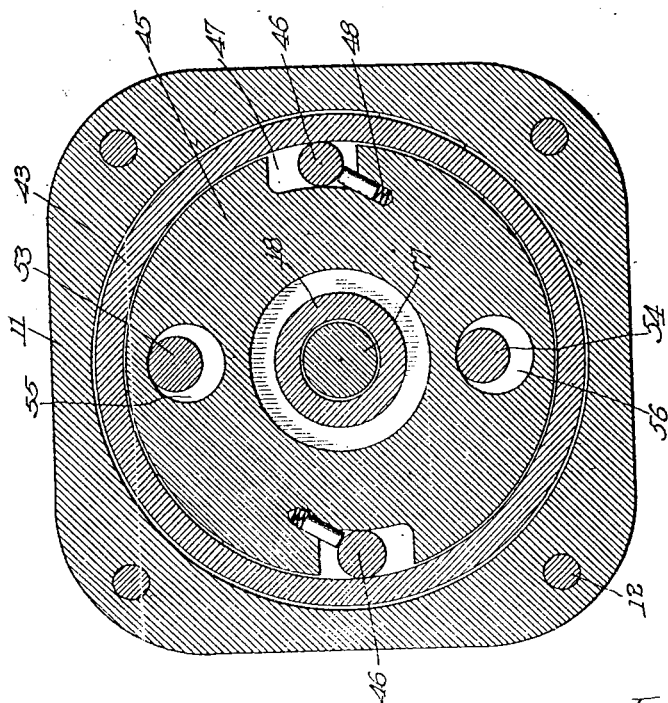
Witnesses:
Robert H. Weir
William Allen
Inventor:
Vincent G. Apple

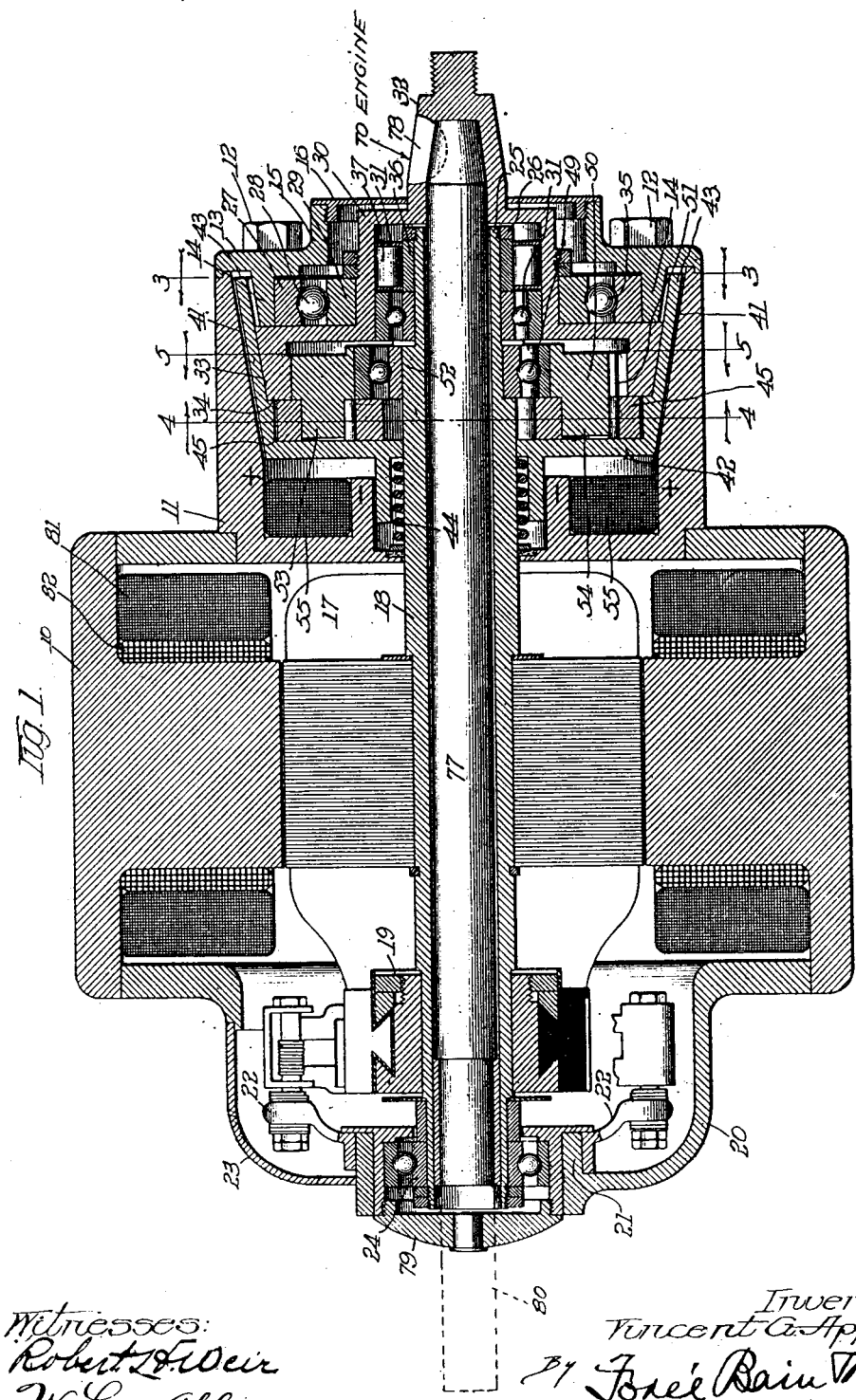

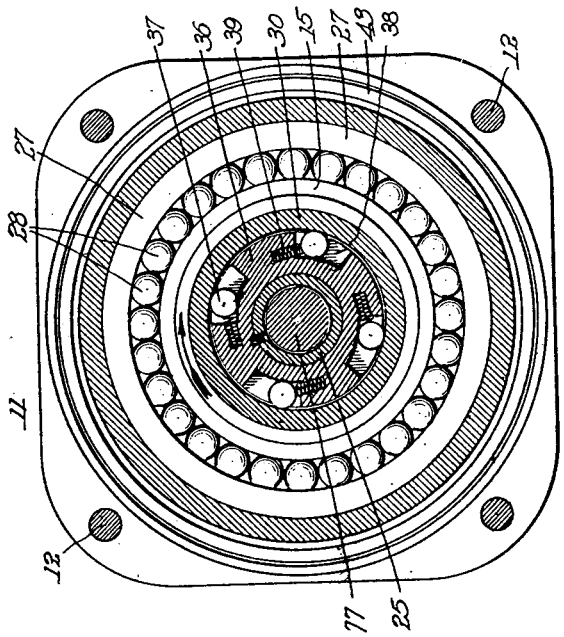
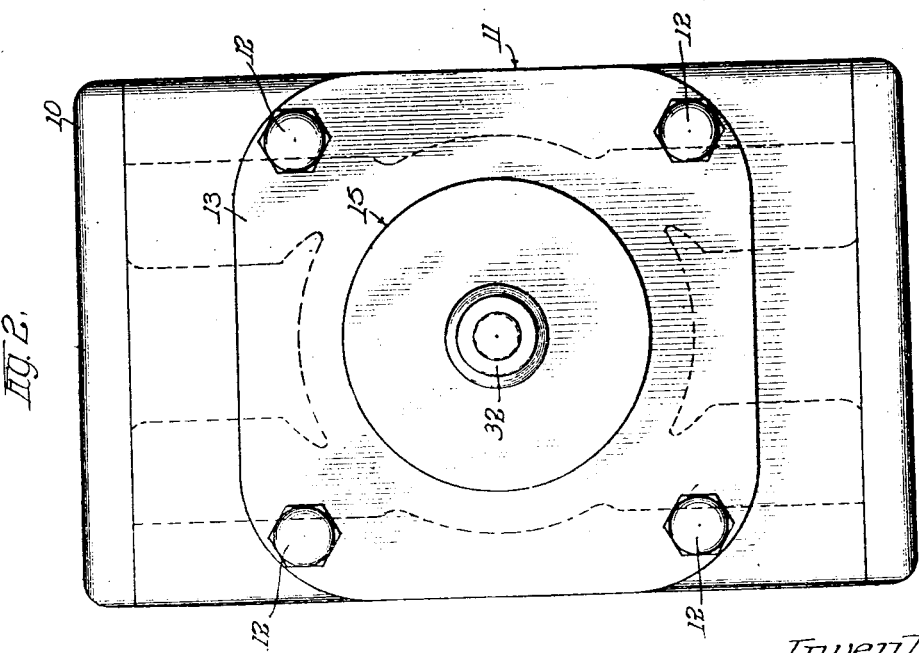

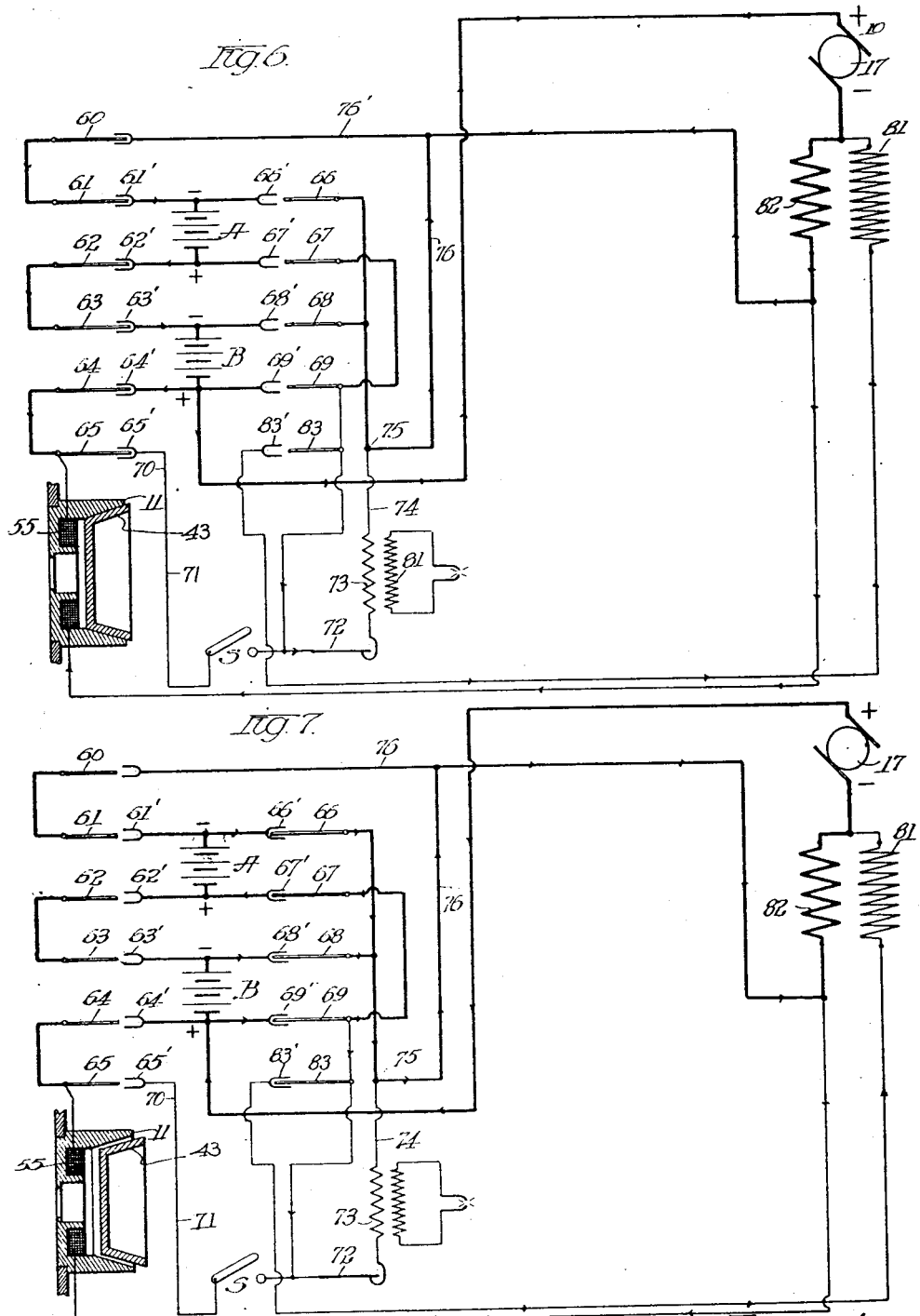

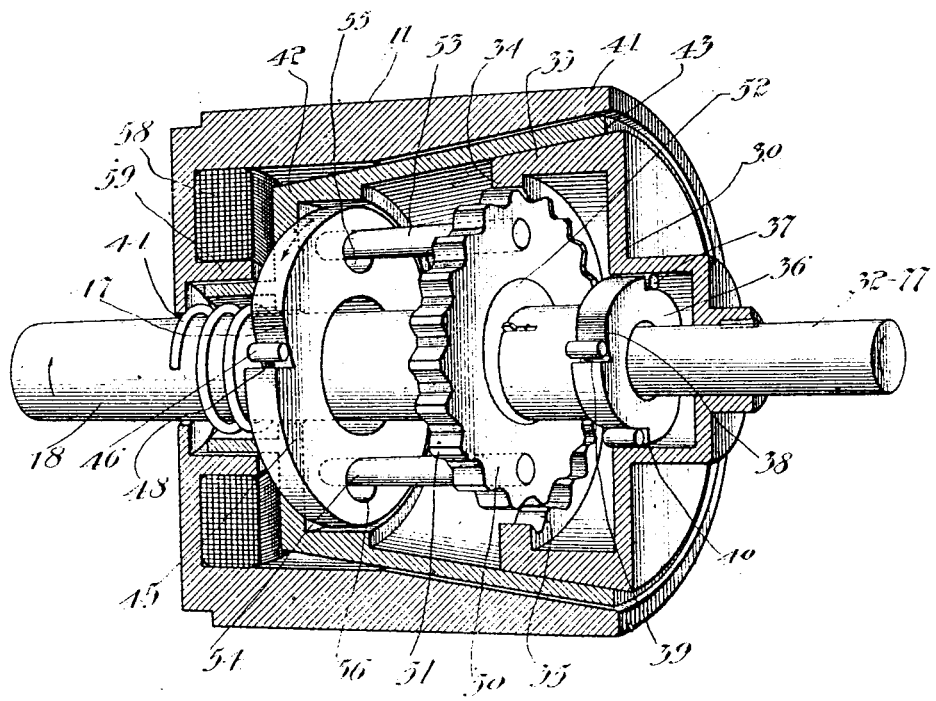

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

POWER-TRANSMISSION GEARING.

1,129,777. Specification of Letters Patent. Patented Feb. 23, 1915.

Application filed November 9, 1912. Serial No. 730,378.

*To all whom it may concern:*

Be it known that I, VINCENT G. APPLE, a citizen of the United States, residing at Dayton, in the county of Montgomery and State of Ohio, have invented certain new and useful Improvements in Power-Transmission Gearing, of which the following is a specification.

My invention relates to improvements in power transmission gearing and more particularly to a form of gearing adapted for interposition between a dynamo electric machine and an internal combustion engine, the dynamo at times acting as a motor to start the engine and at other times being driven by the engine and serving as a generator.

One of the objects of my invention is to provide a construction whereby either of two shafts—as, for instance, the shaft of a dynamo electric machine, and the shaft of a gas engine—may drive the other, but wherein the speed ratio of the shafts is automatically changed accordingly as one or the other is the driver.

A further object of my invention is to provide an advantageous organization for effecting the automatic speed ratio change, especially adapted for use in conjunction with a gas engine and an associated dynamo, so that the dynamo, acting as a motor, may drive the engine at a given speed through a low speed ratio until the engine becomes self propelling, and then the engine, acting as the impeller, may drive the dynamo at the higher speed ratio to utilize the dynamo as a generator.

Another object of my invention is to provide for electrical control of certain actions of the gearing; and further objects are to provide electric circuits and circuit manipulating devices for effecting various associations between the dynamo, the storage batteries, and suitable electro-responsive elements of the gear changing apparatus, to insure proper operation of the parts, accordingly as the dynamo is to operate as a motor or as a generator.

Other objects of my invention are to provide such mechanical inter-relation of parts that the gearing may not be damaged by back firing of the engine, or by running of the engine shaft, whether impulsively or steadily—at a speed between a predetermined speed of the dynamo shaft and the proportionately reduced, predetermined speed at which the engine shaft is geared to be driven by the dynamo shaft; to constitute of the gearing part a rotatable unit revolving as a whole, without relative movements of the toothed gear parts, when the engine shaft acts as a driver; and to make the entire structure compact, rugged and simple.

Other and further objects of my invention will readily become apparent to persons skilled in the art from a consideration of the description when taken in conjunction with the drawings, wherein—

Figure 1 is a longitudinal central section of a dynamo electric machine and the gearing arrangement by which said machine is connected to the engine; Fig. 2 is an end elevation of the machine looking from the engine; Fig. 3 is a transverse section taken on line 3—3 of Fig. 1; Fig. 4 is a similar section taken on line 4—4 of Fig. 1; Fig. 5 is a similar section taken on line 5—5 of Fig. 1; Fig. 6 is a diagrammatic representation of the circuits for controlling the relation of the dynamo electric machine and a series of storage batteries and also for controlling the relation between the said dynamo electric machine and the engine shaft; in this figure the circuits that are necessary to be closed, for operating the dynamo electric machine as a motor, for the purpose of starting the engine, are shown closed; Fig. 7 is a similar diagram of circuits, showing the circuits that are necessary to be closed when the dynamo is being driven by the engine as a generator for charging the storage batteries. Fig. 8 is a skeletonized pseudo-diagrammatic perspective view illustrative of the relations of the principal parts of the gear mechanism, leaving out such details as ball bearings and the like.

In all the views the same reference characters indicate similar parts.

In the drawings, 10 indicates the stationary frame or housing of the magnetic field of the dynamo electric machine. A gear casing 11, is secured to one end of the field magnet housing by means of bolts 12. These bolts secure in place an end housing plate 13 which carries an inturned bearing flange 14 and an outturned flange 15 in which a cover or cap 16 makes a screw-threaded engagement.

An armature 17, of the usual construction, is mounted on a hollow shaft 18 which carries the commutator 19 on its front end. An outwardly projecting portion 20, of the casing, carries an inwardly projecting hub 21 upon which is mounted a brush yoke 22 for supporting the brushes that bear upon the commutator. A cap, or plate, 23 is removable for access to the commutator and to the brushes. The hollow shaft 18 is provided with a ball bearing support 24. The other end of the hollow shaft terminates at 25 at which end it is provided with a screw threaded collar 26. An outer ring 27 of the ball bearing 28 is supported by the inturned flange 14 of the head or cap 13. The inner ball bearing ring 29 supports a shell 30, the hollow shaft 18 being supported in the shell 30 by means of the ball bearing 31. The shell 30 terminates in a tapered screw-threaded shaft 32, which may be termed the engine shaft, as it is the part by which the engine is to be connected to the dynamo electric machine. The innermost part of the shell 30, at its largest diameter is tapered as at 33, and is provided with an overhanging flange as at 34, the inner surface of which is provided with gear teeth as shown in Fig. 5. A clutch member 36 is secured to the hollow shaft 18 and carries clutch engaging roller 37. The clutch member 36 is provided with a plurality of inclined slots 38 in which the roller members 37 lie. (See Fig. 3). Open helical springs 39 exert a yielding pressure against the rollers to force them into the narrowest parts of the slots, to cause them to make clutching engagement with the surrounding cylindrical part of the shell as at 40 when the relative movement of the two members of the clutch is in a given direction and to permit the clutch to disengage when said movement is in the opposite direction, so that when the shell 30, is rotating in one direction, as in the direction shown by the arrow in Fig. 3, clutch member 36 will be carried therewith because the springs 39 will force the rollers 37 into the narrowest part of the slots 38 causing them to engage the rotating shell 30, which tends to crowd them farther into the narrowest portions of said slots, but when the shell is rotated in the opposite direction, the rollers 37 are forced back into the widest portion of their slots, against the resilient action of the springs 39 and there is then no rotating engagement between the clutch parts 36 and 30. Now if the shell 30 be rotated in the same direction shown by the arrow, but at a higher speed than the part 36, the rollers 37 will readily and at once make clutching engagement with the inner clutch member 36 and if the inner member 36 be rotated in the opposite direction then the rollers will also make clutching engagement with the member 30, but if either of the devices be rotated relatively to the other in the opposite direction to that mentioned, it may be rotated independently of the other.

The inner surface of the annular gear casing 11 is tapered as at 41. A longitudinally movable shell 42 is located within the casing 11, and is supported on the hollow shaft 18. It is provided with a tapering surface upon the diverging flange 43 that is adapted for frictional clutching engagement with the inner surface 41 of the stationary casing 11. An open helical compression spring 44, which surrounds the hollow shaft 18, yieldingly holds the shell 42, so that the surface of the flange 43 is normally out of engagement with the correspondingly tapered surfaces 41 of the casing 11. A disk or plate 45, is loosely contained within the flange portion 43 of the hollow shell 42. It is provided with clutch engaging rollers 46 (Fig. 4), contained in slots 47, and acted on by springs 48, whereby they are normally and yieldingly held in clutching engagement with the rim 43. It will be noted that the slots 47 taper in the same direction as do slots 38 of the clutch hereinbefore described, so that if the parts 30 and 42 were both rotated counter clock wise (rotative direction herein being considered as viewed from the engine shaft end of the structure) with motor shaft 18 held stationary, both clutches would release.

Mounted on ball bearings 49, carried on the hollow shaft 18, is a gear member 50, having gear teeth 51 on its outer periphery for transmitting engagement with gear teeth 35 (greater in number) on the gear member 34. The ball bearing 49 is mounted upon an eccentric portion of the shaft 18, as at 52, so that when the shaft 18 is rotated the ball bearing member 49 and the gear plate 50 are each given a floating or wabbling motion, so that the geared periphery of the gear plate is pressed against the geared interior of the member 34 and, in its wabbling movement, causes slow rotation of the latter as the result of the differing number of teeth on the coöperating parts. In order that motion may be transmitted from the gear member 50, to the gear member 34, it is necessary that the gear member 50 shall be permitted to have this peculiar gyratory motion, but that it shall be restrained from rotating and in order to permit it to have this free motion, and at the same time to keep it from being finally rotatable, it is provided with inwardly projecting lugs 53 and 54 that extend into relatively large holes or orifices 55 and 56 made through the plate 45.

Within the casing 11 is provided an electromagnet 57, having its annular coil 58 mounted between the casing wall, as an outer pole ring, and a flange 59 as an inner pole ring, so that said magnet when energized causes the shell 42 to be drawn inwardly toward the coil and to make frictional clutch engagement between the outer tapered surface of the rim 43 and the tapered surface 41 thereby making the shell 42 stationary by its frictional contact with the inner surface of the stationary casing 11.

The operation of the described gearing is as follows:—Assume engine shaft 32 to be at rest, and that it is desired to start the engine from the motor shaft 18, first the motor is started and magnet 57 is energized, drawing cone 43 of shell member 42 into friction-clutch engagement with cone-surface 41 of casing 11. Frictionally, the member 42 is held against rotation in either direction. The shaft 18 is motor driven in a clock wise direction (viewed from the engine shaft end). It rotates the eccentric 52, which wabbles the floating external gear wheel 50, i. e. vibrates it radially or universally in its plane, but without rotation. Now obviously, as gear 52 has less teeth than internal gear 34, say 19 teeth as against 20—it must, when so wabbled or vibrated, either drive the gear 34 forward, clock wise, one revolution to twenty, or it must rotate itself backward, counter clock wise, about its eccentric 52, as a one to twenty ratio to the speed of the motor shaft. Backward rotation stress imposed on gear wheel 50 aids the action of spring 48 to clutch the plate 45 to shell member 42 through the rolling wedges 46, so that under the conditions now assumedly prevailing, one of two things must happen; gear 34 and engine shaft 32 must start forward, clock wise, in the intended fashion at one-twentieth of the predetermined motor shaft speed; or, if a dominant resistance be opposed to the movement of shaft 32, then cone friction clutch 41—43 must slip as gear 50 travels backward around the drive shaft eccentric. Thus the motor and the gearing are safe-guarded against harm, by the friction clutch 41—43 so that even were it foolishly attempted for instance, to start the engine of a mired automobile with the traction wheels connected to the engine through the "high gearing", no damage would result.

The dynamo motor may, of course, run at predetermined speed, as the motor is preferably of constant speed type; and the engine shaft will be driven therefrom through the internal gear 34 at a proportionate, lower, predetermined speed. Should the engine, however, fail to start smoothly, but rather cause its shaft to respond jerkily, intermittently racing or accelerating suddenly on passing high compression points in its cycle, or in any way causing or permitting its shaft to turn, either impulsively or steadily, at a speed less than the predetermined motor shaft speed, but more than the predetermined proportional lower speed at which the engine shaft would be motor-driven, in any such event, such aberrations from the predetermined rot..ive speed, suffered by the engine shaft and its terminal gear 34 will not damage the mechanism, as the only effect will be to free the wedge clutch 45—46—42 during the periods of excess above the predetermined proportional speed. This, because if shaft 32 turns at more than 1 to 20 with respect to the substantially constant motor shaft speed, its internal gear 34 turns the floating gear wheel 50 with it, clock wise, about eccentric 52. This rolls wedge-rollers 46 to the deep ends of their pockets and releases the reduction gear clutch. It does not however, throw in the direct acting clutch 36—39—30, as will be obvious. Thus the motor-impelled speed of drive shaft 18 being inherently a known quantity, imposed by the constant speed motor, rotation of internal gear 34 at more than its predetermined speed (one-twentieth of the predetermined motor-shaft speed) has the effect of rotating the spur gear wheel 50, although the rotation of spur wheel 50 is prevented by clutch 45—46—42 when the rotary speed of internal gear 34 is less than said predetermined, or normal, starting-speed.

When the engine "picks up" and becomes self-impelling its shaft speed is usually in excess of that of the motor shaft. As soon as this condition exists, clutch 36—37—30 acts, making direct or one to one connection, between the shaft 32 and 18. If magnet 57 remains energized (which is not however a normal continuing condition, as will become apparent hereinafter) wedge clutches 46 will release so that plates 45 and spur-gear 50 will rotate freely in unison with the two shafts. In point of fact, magnet 57 is intended to be deënergized as soon as the engine picks up. Thereupon the shell 42 is sprung back, cone 43 engages the cone surface 33 of member 30, and the whole movable structure of the gear mechanism rotates as a unit, without relative movement between any of its movable parts and hence without noise, wear, or play between the parts. Should the engine "back-fire" in starting, thus suddenly reversing the direction of rotation of its shaft, turning it counter clock wise at high speed, the clutches 37 remain released and cone clutch 41—43 slips enabling the spur gear 50 with its controller plate 45, to rotate backward or counter clock wise under the impulsion of gear 50.

It will be noted that while cone clutch 43—33 is useful in aiding the shell 42, to rotate with the rest of the gearing under engine impulsion, it is not essential to the operation of the structure, but somewhere in the line of power connection between the two shafts, there should preferably be a friction clutch, as 41—43 to enable the engine shaft to be rotated backward suddenly without stopping the forward rotation of motor shaft 18 and without damaging the gear-wheels, as otherwise extraordinary precautions to prevent back firing would need to be adopted, with respect to the engine.

When the dynamo electric machine is acting as a motor for the purpose of starting the internal combustion engine, the batteries that are used for energizing the dynamo are connected in series relation and when the dynamo is driven as a generator, for the purpose of storing current in the batteries they are connected in parallel relation.

In the diagrams Figs. 6 and 7, I have shown the means for obtaining these results.

Referring now to diagram Fig. 6, 10 is a dynamo electric machine, 17 is the armature thereof, A and B are two separate storage batteries of 6 volts each. The series of switches composed of switch blades indicated by reference characters 60 to 65 inclusive and switch clips 60' to 65' inclusive, that are located on the left hand, are shown closed, while the switch blades which are indicated on the right hand side by 66 to 69 inclusive, and the coöperating clips are 66' to 69' inclusive and blade 83 and clip 83' are shown open. The direction of current from the positive side of the battery, is shown by the arrows. The current will flow in the direction indicated by the arrows when the switches on the left hand side are closed and the batteries thereby are included in series, of 12 volts difference of potential, for the purpose of starting the dynamo electric machine, as a motor, for cranking the engine. This general feature of the present invention is described and claimed in a former application which I have heretofore made and which is identified by Serial No. 710,864, filed July 10, 1912.

Fig. 7 shows the direction of the current when the switch on the right hand side is closed and when the dynamo is being operated by the engine as a generator. When the circuits are in condition shown in Fig. 6, a supplementary independent controlling circuit begins at clip 65', and is continued over wires 70 and 71 to supplementary switch S, over wire 72 through the primary coil 73 of the sparking coil, over wire 74 to the main switch and thence over wires 76 and 76' to the negative terminal of the batteries, thus including these devices in a 12 volt circuit. The gear changing electro-responsive device 43, is connected in an independent circuit, closed only by the main switch when the dynamo is operating as a motor and which circuit begins at blade 65, passes through coil 58 and terminates at the negative terminal of the dynamo. At this time the shunt field circuit is open, as at blade 83 and clip 83'. Of course it is evident that my invention is not limited to this precise location of the electro-responsive device in the circuit as any means for energizing coil 55 will fall within the intendment of my system.

When the main switch as shown in Fig. 7 is closed and the one on the left is open, batteries are then in parallel relation ready for charging at six volts and at this time the clutch coil 55 is deënergized and direct connection between the dynamo and the engine is automatically permitted by the operation of the gear mechanism heretofore described.

Now referring to Fig. 1 it will be observed that there is an internal shaft 77 connected to the part 32 by means of a key 78 so that the shaft 77 will always turn the same number of revolutions the engine shaft is being revolved. It will be further observed that a screw cap 79 may be used to close the end of the housing when the shaft 77 is not sufficiently long to project beyond the screw cap.

When desirable the screw cap 79 may be removed and the shaft 77 may be made longer to extend beyond the bearing 24, as shown by 80 in dotted lines, and from this end 80 the speed changing mechanism or gear may be driven and when desirable connection may be made between the extension 80 and the engine shaft by chain, train of gears, bolts, or the like, when the engine is not connected to the end 32, as heretofore suggested, and a speed ratio between the shaft 77 and the engine shaft proper may thus be established by the connecting gearing, or when the engine is so connected to the end 32 the projecting end 80 may be used to drive the spark timer or distributer, to drive the fan, or a magneto if desired.

While I have shown one situation in which the clutch coil 58 may be located and the means for energizing it, it is, of course, evident that other circuits than described and other means than those shown may be employed for the purpose. For instance, the coil 55 may be included in circuit with the shunt field winding 81 of the dynamo; in the series with the winding 82 of the dynamo, as shown, or elsewhere when arrangement of circuits are employed other than shown in Figs. 6 and 7.

While I have herein shown a specific exemplification for purpose of clear disclosure, it is evident that many changes may be made therein without departing from the spirit and scope of the appended claims.

Having described my invention, what I claim is:—

1. In a gearing of the class described, two shafts to be rotated; a housing therefor; clutch parts, associated with said shafts, movable to engage and to disengage said shafts; a casing, containing said parts; an electro-responsive means in said casing, for effecting engagement of said parts, when energized; means for energizing said responsive means, located without the casing, and yielding means for effecting disengagement thereof when said responsive means is deënergized.

2. In a gearing of the class described, the combination with a housing; a casing connected therewith; two rotatable members in said casing, to be connected together; speed-changing gears adapted and arranged for interposition between said members; an electro-responsive means, for operatively including said speed-changing gears between said members, when energized, and means, without said casing, for energizing said responsive means.

3. In an equipment of the character described, the combination with a casing; two rotatable members in said casing, normally directly connected together; speed-changing gears adapted and arranged for operative interposition between said members; an electro-responsive means for effecting such interposed connection and for permitting disabling of the direct connection, when energized, and means outside of said casing for energizing said responsive means.

4. In an equipment of the character described, the combination with a casing; two rotatable members in said casing; clutching means adapted by differences in speed of said rotatable members, for directly connecting said members together; speed-changing gearing, adapted and arranged for operative interposition between said rotatable members and for disengaging said clutch members, when so interposed, and an electro-responsive means for effecting the interposition of said speed-changing gearing.

5. In an equipment of the character described, the combination with a casing; two rotatable members in said casing; clutching means, operated by differences in speed of said members, for directly connecting said members together; speed changing gearing adapted and arranged for operative interposition between said rotatable members and for disengaging said clutch members, when so interposed; an electro-responsive means for effecting the interposition of said speed-changing gearing, when energized, and automatic means for restoring said connection when said electro-responsive means is deënergized.

6. In an equipment of the character described, the combination with a casing; two rotatable members in said casing; speed-changing gearing for interposition between said rotatable members operative when one member of the said gear is prevented from rotating; and an electro-responsive means for preventing rotation of said gear member, when energized; a source of electric energy; a circuit, and a switch for controlling said circuit to energize and deënergize said electro-responsive means.

7. In an equipment of the character described, the combination with a casing; two rotatable members therein, one to be driven by the other, a clutch adapted for automatically connecting said members directly together when said primarily driven element is rotating at a higher velocity than the primary driving element and to disconnect said members when said conditions are reversed; a speed-changing gearing for operative interposition between said members and for rotating said primarily driving element at a higher velocity and the said primarily driven element at a lower velocity, thereby to disconnect the said clutch, and an electro-responsive means for controlling said speed-changing gearing.

8. The combination of a driving shaft, an eccentric rotating therewith; a driven shaft; an internal gear wheel secured to the driven shaft; a spur gear wheel mounted on the eccentric and having teeth engaging the teeth of the internal gear wheel; means to prevent the rotation of the spur-gear wheel, said means permitting rotation of the spur-gear wheel when the direction of torque on the internal gear wheel is reversed.

9. The combination of a driving shaft, an eccentric rotating therewith, a driven shaft, an internal gear wheel secured to the driven shaft, a spur-gear wheel mounted on the eccentric and having teeth engaging the teeth of the internal gear wheel, means to prevent rotation of the spur-gear wheel comprising a plate, means to lock the plate to the spur-gear wheel to permit a floating movement of the latter, and means to lock the plate against rotation under normal conditions, said means permitting the rotation of said plate and spur-gear wheel when the direction of torque on the internal gear wheel is reversed.

10. The combination of a driving shaft; an eccentric rotatable therewith; a driven shaft; an internal gear wheel rotatable with the driven shaft; a spur-gear wheel mounted on the eccentric and having a different number of teeth from that of the internal gear wheel, said teeth in mesh relation with the teeth of the said internal gear wheel; means to prevent rotation of the spur-gear wheel, said means permitting rotation of the spur-gear wheel when the direction of torque on the internal gear wheel is reversed.

11. The combination of a driving shaft; an eccentric rotatable therewith; a driven shaft; an internal gear wheel rotatable with the driven shaft; a spur-gear wheel mounted on the eccentric and having a different number of teeth from that of the internal gear wheel, the teeth of the said wheels intermeshing; means to prevent rotation of the spur-gear wheel comprising a plate; means to lock said plate to the spur-gear wheel to permit a floating movement of the latter; and means to lock the plate against rotation under normal conditions, said means permitting the rotation of said plate and spur-gear wheel when the direction of torque on the internal gear wheel is reversed.

12. The combination of a driving shaft, an eccentric rotating therewith, a driven shaft, an internal gear wheel secured to the driven shaft, a spur-gear wheel mounted on the eccentric and having teeth engaging the teeth of the internal gear wheel, means to prevent the rotation of the spur-gear wheel comprising an annular plate locked to the spur gear wheel to permit only a floating movement of the latter, a ring surrounding the annular plate having a surface for coaction with a rolling wedge clutch, said plate having cam pockets, rolling wedge clutches in said pockets to frictionally lock the plate and ring, and means to lock the ring and to automatically release it above a predetermined resistance.

13. The combination of a driving shaft, an eccentric rotatable therewith; a driven shaft; a spur-gear wheel mounted on the eccentric and having teeth engaging the teeth of the internal gear wheel and having a different number of teeth therefrom; means to prevent rotation of the spur-gear wheel comprising an annular plate locked to the spur-gear wheel to permit a floating movement of the latter; a ring surrounding the annular plate having a rolling clutch engaging portion on its inner surface, said plate having cam pockets; rolling members in said pockets to frictionally lock the plate and ring, and means to lock the ring and to automatically release it above a predetermined resistance.

14. The combination of a driving shaft; an eccentric rotatable therewith; a floating spur-gear wheel mounted on the eccentric; an internal gear wheel having a different number of teeth from that of the spur-gear wheel, said teeth meshing with the teeth of said spur-gear wheel; a driven shaft; and means associated with said intermeshing gear wheels to effect conection between said driving and driven shafts, said means including coöperating parts adapted to release at a predetermined strain thereon.

15. The combination of a driving shaft; an eccentric rotatable therewith; a floating spur-gear wheel mounted on the eccentric; an internal gear wheel meshing with said spur-gear wheel and having a different number of teeth therefrom; a driven shaft; and means associated with said intermeshing gear wheels to effect connection between said driving and driven shafts, said means including frictionally engaging parts adapted to release at a predetermined strain thereon.

16. The combination with a driving and a driven shaft; of speed-reducing means for connecting said shafts for rotation of the latter by the former; said means including a spur-gear wheel and an intermeshing internal gear wheel having different numbers of teeth; means for connecting the spur-gear wheel to a stationary part; and means for connecting the internal gear wheel to the driven shaft, one of said connecting means for the gear wheel including frictionally engaging parts.

17. The combination with a driving and a driven shaft; of speed-reducing means for connecting said shafts for rotation of the latter by the former; said means including a spur-gear and an intermeshing internal gear wheel having different numbers of teeth; the spur-gear wheel being carried by the driving shaft for floating movement and the internal gear wheel being connected to the driven shaft, and locking means for the spur-gear wheel comprising inter-engaging parts adapted to permit movement of the spur-gear wheel upon excessive strain between said inter-engaging parts.

18. The combination with a driving and a driven shaft; of a member carried by the said driven shaft providing an interior geared portion and a portion for coaction with a clutch: a clutch between the driving shaft and the last said portion of said member; a spur-gear wheel having a different number of teeth from its intermeshing member, carried by said driving shaft for floating movement, and intermeshing with the said internal gear portion of the said member; and means including a shiftable clutch member for locking said spur gear to a frictionally restrained part.

19. In a gearing of the class described, two shafts to be rotated; a housing therefor; clutch parts associated with said shafts and movable to directly engage and disengage said shafts: speed reducing gearing for interposition between said shafts, rotatable therewith when said shafts are directly engaged by said clutch; means to disable said directly connecting clutch and means to interpose said reduction gearing between said shafts, both said means operable by the relative change of speed of said shafts.

20. Gearing comprising, in combination with a drive shaft and a driven shaft, the latter subject to changes of rotative conditions from extraneous sources; a speed reduction device providing differently-toothed internal and external gear-members; an eccentric on one shaft for wabbling one of said gear members, and one way clutch means opposing rotative movement of the wabbled gear member.

21. Gearing, comprising, in combination, two shafts, a stationary or nor rotating part, a speed reducing device comprising internal-gear and external-gear members associated with the respective shafts; means between one shaft and its gear member for wabbling the latter, and means including a one-way clutch co-acting with said stationary part for opposing rotation of said wabbling gear member.

22. Gearing, comprising, in combination, two shafts, a stationary or non-rotating part, a speed reducing device comprising internal-gear and external-gear members associated with the respective shafts; means between one shaft and its gear member for wabbling the latter, means including a one way clutch coacting with the stationary part for opposing rotation of said wabbling gear member and a friction clutch structure interposed in the gearing between the stationary part and the shaft to be driven.

23. Gearing comprising, in combination with two shafts, a direct one way rolling wedge clutch between the shafts, a speed reducing device comprising differently-toothed internal and external gear members, an eccentric on one shaft for vibrating one of said gear members universally; and means to prevent rotation of said gear member when the eccentric carrying shaft is rotated in direction to free itself from connection through said direct clutch; said means comprising a relatively stationary part and a one way rolling wedge clutch, said clutch interposed between said stationary part and said vibrated gear member.

24. Gearing comprising, in combination with two shafts, direct acting one-way, rolling wedge-clutch means therebetween, operable when one shaft drives forward; and reducing gear means for connecting said shafts when the other shaft drives forward said reducing gear means comprising internal and external gear members, differently toothed, means on the last said shaft for vibrating universally one of said gears, and friction clutch means opposing rotation of said gear-member.

25. Gearing, comprising, in combination, two shafts; a housing or coupling structure comprising a shell part normally rotatable with one shaft, but separate therefrom; and within said housing a direct acting clutch between said one shaft and the other, and speed changing gearing between said other shaft and the one, comprising a plate to be held against rotation and a clutch for holding it working against said part of said shell, and means for holding said shell-part against rotation, whereby said shell part rotates with the shafts when they are directly connected and affords a clutch-abutment when the speed changing gearing is employed.

26. The combination with a driving and a driven shaft; of a member carried by the said driven shaft providing an interior geared portion and a portion for coaction with a clutch member; a clutch member between the driving shaft and the last said portion of said member; a spur gear wheel carried by said driving shaft for floating movement and having a different number of teeth from and intermeshing with the said internal geared portion of the said member; a fixed casing surrounding the said parts, a shiftable clutch member connected with said spur gear and means for engaging the said clutch member with the stationary casing.

27. The combination with a driving and a driven shaft; of a member carried by the said driven shaft providing an interior geared portion and a portion for coaction with a clutch member; a clutch member between the driving shaft and the last said portion of said member; a spur gear wheel carried by said driving shaft for floating movement, and having a different number of teeth from and intermeshing with said internal geared portion of the said member; a fixed casing surrounding the said parts; a shiftable clutch member connected with the said spur gear, means for engaging the said clutch member with the said stationary casing and means exterior of the said casing for controlling the said clutch engaging means.

28. The combination with a driving and a driven shaft; of a member carried by the said driven shaft providing an interior geared portion and a portion for coaction with a clutch member; a clutch member between the driving shaft and the last said portion of said member; a spur gear wheel carried by said driving shaft for a floating movement, and having a different number of teeth from and intermeshing with the said internal gear portion of the said member; a fixed casing surrounding the said part; a shiftable clutch member connected with the said spur gear; means for engaging the said clutch member with the stationary casing and means for disengaging the said clutch member from the stationary casing and engaging it with the said member carried by the driven shaft.

29. A power transmitting gearing comprising primary and secondary rotatable members, reduction gearing connecting said members when the primary member is driving, a control member for said gearing, the torque of which is reversed when the secondary member becomes the driver, a stationary part and a one way clutch between said stationary part and the control member.

30. A power transmitting gearing comprising primary and secondary rotatable members, reduction gearing connecting said members when the primary member is driving, a control member for said gearing, the torque of which is reversed when the secondary member becomes the driver, a clutch part, a one way clutch between said clutch part and the control member and means for preventing the rotation of said clutch part.

31. A power transmitting gearing comprising primary and secondary rotatable members, reduction gearing connecting said members when the primary member is driving, a control member for said gearing, the torque of which is reversed when the secondary member becomes the driver, a clutch part, a one way clutch between said control member and the clutch part, a casing and means for frictionally engaging said clutch part with said casing.

32. A power transmitting gearing comprising a primary and secondary rotatable member, reduction gearing connecting said members when the primary member is driving, a control member for said gearing, the torque of which is reversed when the secondary member becomes the driver, a clutch part, a one way clutch between said clutch part and control member, a casing, and magnetic means carried by said casing for preventing the rotation of said clutch part.

In testimony whereof I hereunto set my hand in the presence of two witnesses.

VINCENT G. APPLE.

In the presence of—
FORÉE BAIN,
MARY F. ALLEN.